United States Patent
Benisty (10) Patent No.: US 12,204,753 B2
(45) Date of Patent: Jan. 21, 2025

(54) UNALIGNED DEALLOCATED LOGICAL BLOCKS DATAPATH SUPPORT

(71) Applicant: Western Digital Technologies, Inc., San Jose, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 204 days.

(21) Appl. No.: 17/950,603

(22) Filed: Sep. 22, 2022

(65) Prior Publication Data
US 2024/0103723 A1  Mar. 28, 2024

(51) Int. Cl.
*G06F 3/06* (2006.01)
(52) U.S. Cl.
CPC ............ *G06F 3/061* (2013.01); *G06F 3/0652* (2013.01); *G06F 3/0659* (2013.01); *G06F 3/0679* (2013.01)
(58) Field of Classification Search
CPC ...... G06F 3/061; G06F 3/0652; G06F 3/0659; G06F 3/0679; G06N 3/02
See application file for complete search history.

(56) References Cited

U.S. PATENT DOCUMENTS

| | | | |
|---|---|---|---|
| 9,367,444 B2 | 6/2016 | Hashimoto | |
| 9,880,770 B2 | 1/2018 | Zhang et al. | |
| 10,157,012 B2 | 12/2018 | Kelner et al. | |
| 10,922,242 B2 | 2/2021 | Lappi et al. | |
| 11,144,453 B2 | 10/2021 | Nazari et al. | |
| 11,288,204 B2 | 3/2022 | Gerhart et al. | |
| 2021/0019088 A1* | 1/2021 | Zhu | G06F 11/1004 |
| 2022/0019383 A1 | 1/2022 | Zhu et al. | |
| 2024/0069771 A1* | 2/2024 | Virani | G06F 3/0604 |

* cited by examiner

*Primary Examiner* — Charles Rones
*Assistant Examiner* — Han V Doan
(74) *Attorney, Agent, or Firm* — PATTERSON + SHERIDAN, LLP (57) ABSTRACT

The present disclosure generally relates to improved unaligned deallocated logical block transfer. Rather than stalling the data-path in unaligned deallocated LBA scenarios, the data-path will work regularly while ignoring the unaligned deallocated indication. The old and non-valid data received for the unaligned deallocated LBA will be written to the host. The device controller will detect the unaligned deallocated LBA and overwrite the data with other values such as 0's or 1's as specified in the standard. The implementation increases the performance of unaligned deallocated commands and the endurance of the NVM. The implementation also simplifies the logic implemented in the device controller.

20 Claims, 7 Drawing Sheets

UNALIGNED DEALLOCATED LOGICAL BLOCKS DATAPATH SUPPORT

BACKGROUND OF THE DISCLOSURE

Field of the Disclosure

Embodiments of the present disclosure generally relate to improved unaligned deallocated logical block transfer.

Description of the Related Art

A trim command (known as TRIM in the ATA command set, unmap in the SCSI command set and deallocated in NVMe) allows an operating system to inform a solid-state drive (SSD) the blocks of data that are no longer considered to be 'in use' and therefore can be erased internally.

Trim was introduced soon after SSDs were introduced. Low-level operation of SSDs differs significantly from hard drives, the typical way in which operating systems handle operations like deletes and formats resulted in unanticipated progressive performance degradation of write operations on SSDs. Trimming enables the SSD to more efficiently handle garbage collection, which would otherwise slow future write operations to the involved blocks.

The value read from a deallocated logical block shall be deterministic; specifically, the value returned by subsequent reads of that logical block shall be the same until a write operation occurs to that logical block. A deallocated logical block is defined in the standard as logical block address (LBA) that was declared as a result of one of the following: a logical block that has never been written to; a logical block that has been deallocated using the dataset management NVMe command; a logical block that has been initialized using the write zeroes or the sanitize commands.

Using the NVMe error recovery feature, the host software may select the behavior of the controller when reading deallocated or unwritten blocks. The host software may select that the device will complete the command with error status or not. If the deallocated or unwritten logical error is not enabled, the values read from a deallocated or unwritten block and its metadata (excluding protection information) shall be one of: all bytes cleared to 0 h if bits 2:0 in the DLFEAT field are set to 001b; all bytes set to FFh if bits 2:0 in the DLFEAT field are set to 010b; either all bytes cleared to 0 h or all bytes set to FFh if bits 2:0 in the DLFEAT field are set to 000b.

The values read from a deallocated or unwritten logical block's protection information field shall have the following: have each byte in the guard field value set to FFh or set to the CRC for the value read from the deallocated logical block and its metadata (excluding protection information) (e.g., cleared to 0 h if the value read is all bytes cleared to 0 h); and have each byte in the application tag field, storage tag field, if defined, and the logical block reference tag value set to FFh.

In previous approaches, unaligned deallocated data was supported in the data-path, but the main drawbacks to supporting in the data-path are the complexity, non-flexible solution and the risks adding to the product supporting everything in the data-path. Another approach was detection and stalling where the hardware (HW) detects the scenarios of unaligned deallocated sectors and stalls the data path and the firmware (FW) intervenes and implement the transfers manually. The main drawback is the impact on quality-of-service (due to the stall) and the risk for potential deadlocks in the system.

Therefore, there is a need in the art for improved unaligned deallocated logical block transfer.

SUMMARY OF THE DISCLOSURE

The present disclosure generally relates to improved unaligned deallocated logical block transfer. Rather than stalling the data-path in unaligned deallocated LBA scenarios, the data-path will work regularly while ignoring the unaligned deallocated indication. The old and non-valid data received for the unaligned deallocated LBA will be written to the host. The device controller will detect the unaligned deallocated LBA and overwrite the data with other values such as 0's or 1's as specified in the standard. The implementation increases the performance of unaligned deallocated commands and the endurance of the NVM. The implementation also simplifies the logic implemented in the device controller.

In another embodiment, a data storage device comprises: a memory device; and a controller coupled to the memory device, wherein the controller comprises: a host interface module (HIM) configured to be coupled to a host device; and a flash interface module (FIM) coupled to the memory device, wherein the controller is configured to: receive a read command from the host device; read the data from the memory device; send the data to the host device; determine that at least one sector of the data is deallocated, uncorrectable, or has a key version mismatch; and overwrite the at least one sector in the host device.

In another embodiment, a data storage device comprises: a memory device; and a controller coupled to the memory device, wherein the controller comprises: a neural network (NN) command interpretation unit; a logical block address (LBA) to physical block address (PBA) (L2P) mapping generator coupled to the NN command interpretation unit, wherein the controller is configured to fetch training data and NN parameters from the memory device; and a compression engine coupled to both the NN command interpretation unit and the L2P mapping generator.

In another embodiment, a data storage device comprises: memory means; and a controller coupled to the memory means, wherein the controller is configured to: retrieve deallocated data from the memory means; send the deallocated data to a host device; and overwrite the deallocated data in the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improved unaligned deallocated logical block transfer. Rather than stalling the data-path in unaligned deallocated LBA scenarios, the data-path will work regularly while ignoring the unaligned deallocated indication. The old and non-valid data received for the unaligned deallocated LBA will be written to the host. The device controller will detect the unaligned deallocated LBA and overwrite the data with other values such as 0's or 1's as specified in the standard. The implementation increases the performance of unaligned deallocated commands and the endurance of the NVM. The implementation also simplifies the logic implemented in the device controller.

Figure 1:
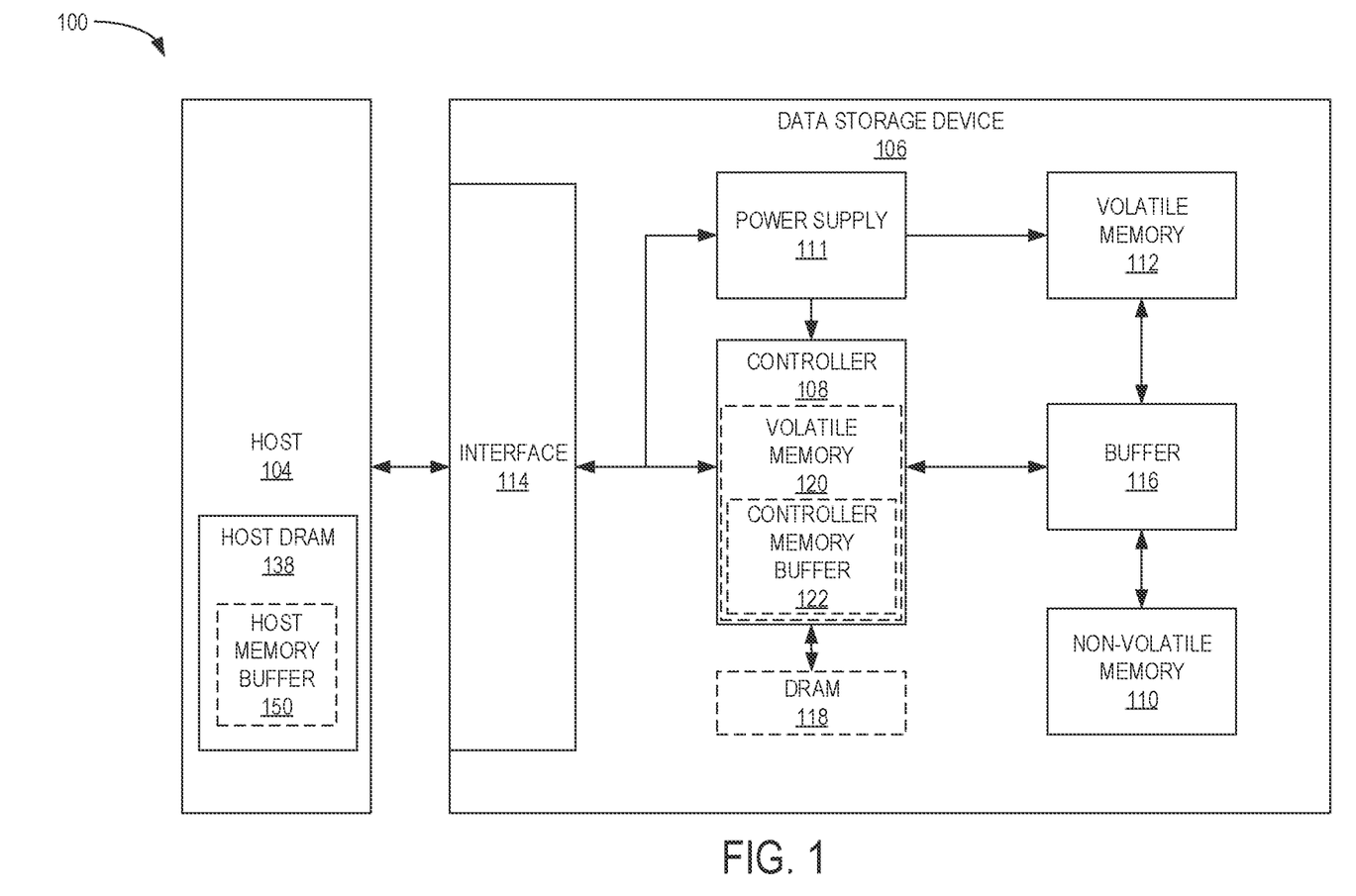
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

When receiving a deallocation request from a host device, the device controller does not really write any user data (0's or 1's) to the memory device (e.g., NAND). Instead, the LBA is just marked as deallocated while leaving the old data in the memory device. As will be discussed below, the disclosure increases performance of the deallocation command and the endurance of the memory device.

Figure 2:
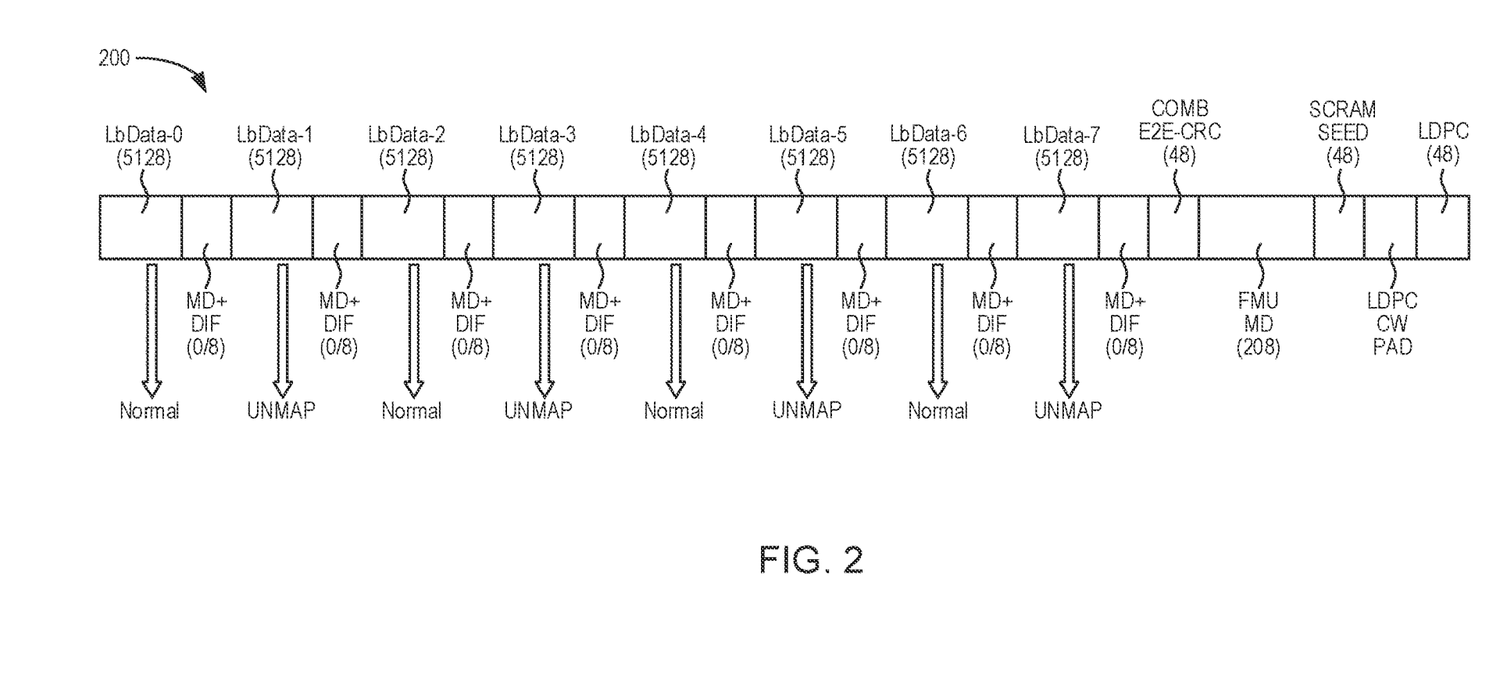
FIG. 2 is an exemplary illustration of an internal packet structure, according to certain embodiments.

FIG. 2 is an exemplary illustration of an internal packet structure 200, according to certain embodiments. FIG. 200 depicts one example of a structure of the internal packet held in the device controller. It is to be understood while the data packet in FIG. 200 is configured with 512-byte sectors, in another example the byte size may be more or less than the 512-bytes. The granularity is 4 KB and therefore the packet holds eight 512-byte sectors plus the packets metadata, various controls, and status fields. In structure 200, some of the sectors are listed as normal (i.e., mapped and aligned) while some sectors are listed as unmapped (i.e., deallocated). The unmapped sectors are also considered unaligned transfers. The normal and unmapped sectors complicates the data-path since the logic needs to treat each sector separately and fine-tune the data-path.

Today SSD's do not work in granularity of 512-bytes. The internal alignment is 4 KB or even more. So, all 512-bytes transfers are considered as unaligned transfers. For support, the device controller operates read-modify-write operations in the background to update partial pages of 4 KB. Supporting unaligned deallocate operations in the data-path adds extra complexity and adds risks to the products.

As will be discussed herein, the disclosure involves the concept of not stalling the data-path in unaligned deallocated LBA scenarios. Instead, the data-path works regularly while ignoring the unaligned deallocated indication which means that old and non-valid data for the unaligned deallocated LBA is written to the host device. The data storage device controller simply detects the unaligned deallocated LBA and disables the auto-completion. Instead, another logic is notified (whether FW or HW) which is responsible for overwriting the data of the unaligned deallocated LBA with other values such as 0's or 1's as specified in the standard.

Figure 3:
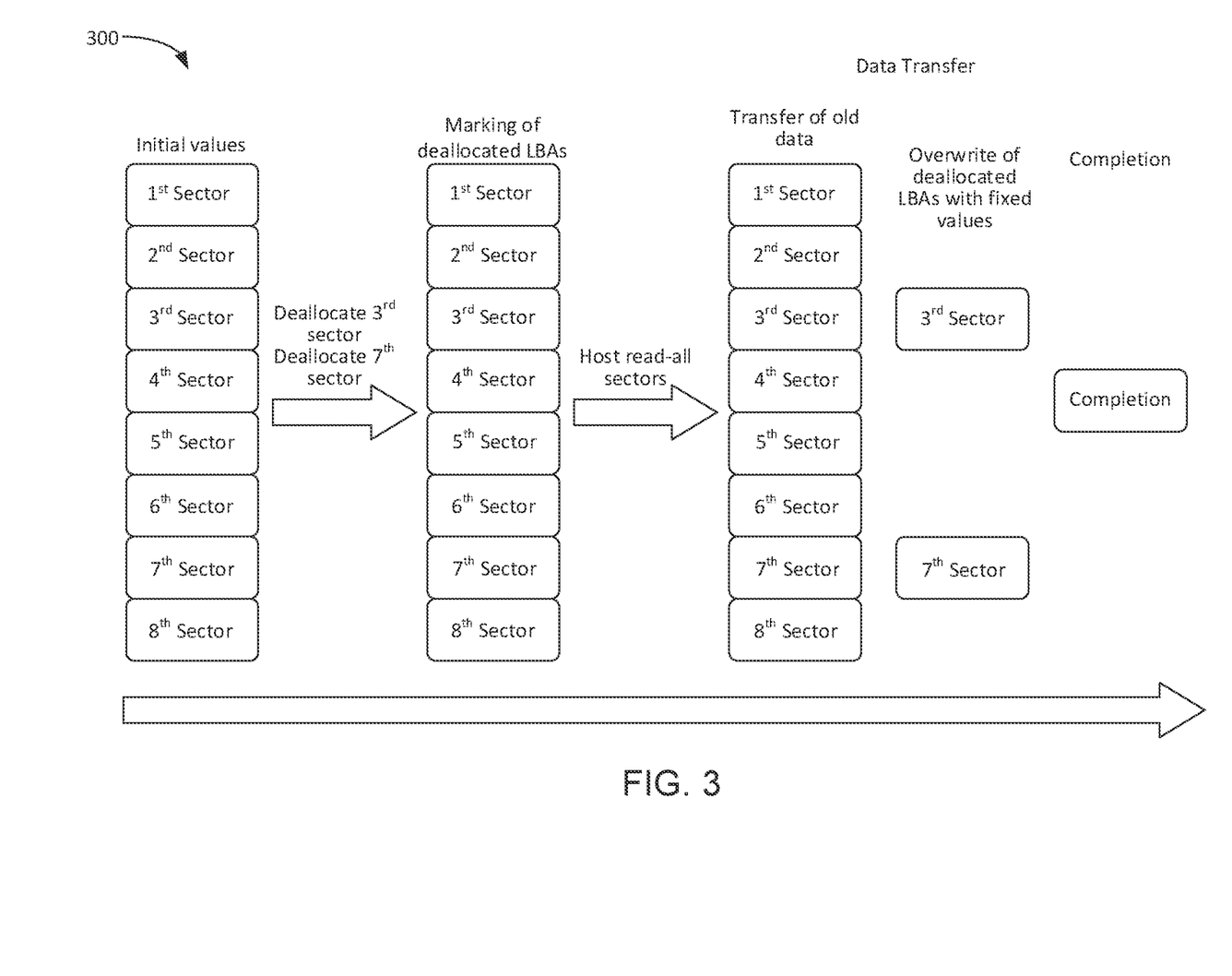
FIG. 3 is a flow diagram illustrating a method for sector data transfers, according to certain embodiments.

FIG. 3 is a flow diagram 300 illustrating a method for sector data transfers, according to certain embodiments. It is to be understood that the example shows two sectors that are considered deallocated, but there can be more or less sectors that are considered deallocated. A 4 KB buffer is illustrated in the method which cooperates eight 512-byte sectors. The host device deallocates the third and seventh sectors. The data storage device does not write 0's or 1's data to the NAND for the third and seventh sector. Instead, the relevant sectors are just marked as deallocated. Later, the host device reads the entire 4 KB including all 8 sectors. The device controller then issues the data transfer in two phases. In the first phase the data that is held in the memory device (e.g., NAND) is transferred. In the second phase, the device controller overwrites the deallocated sectors with fixed values (e.g. 0's or 1's). Finally, a completion entry will be posted to the host device.

Figure 4:
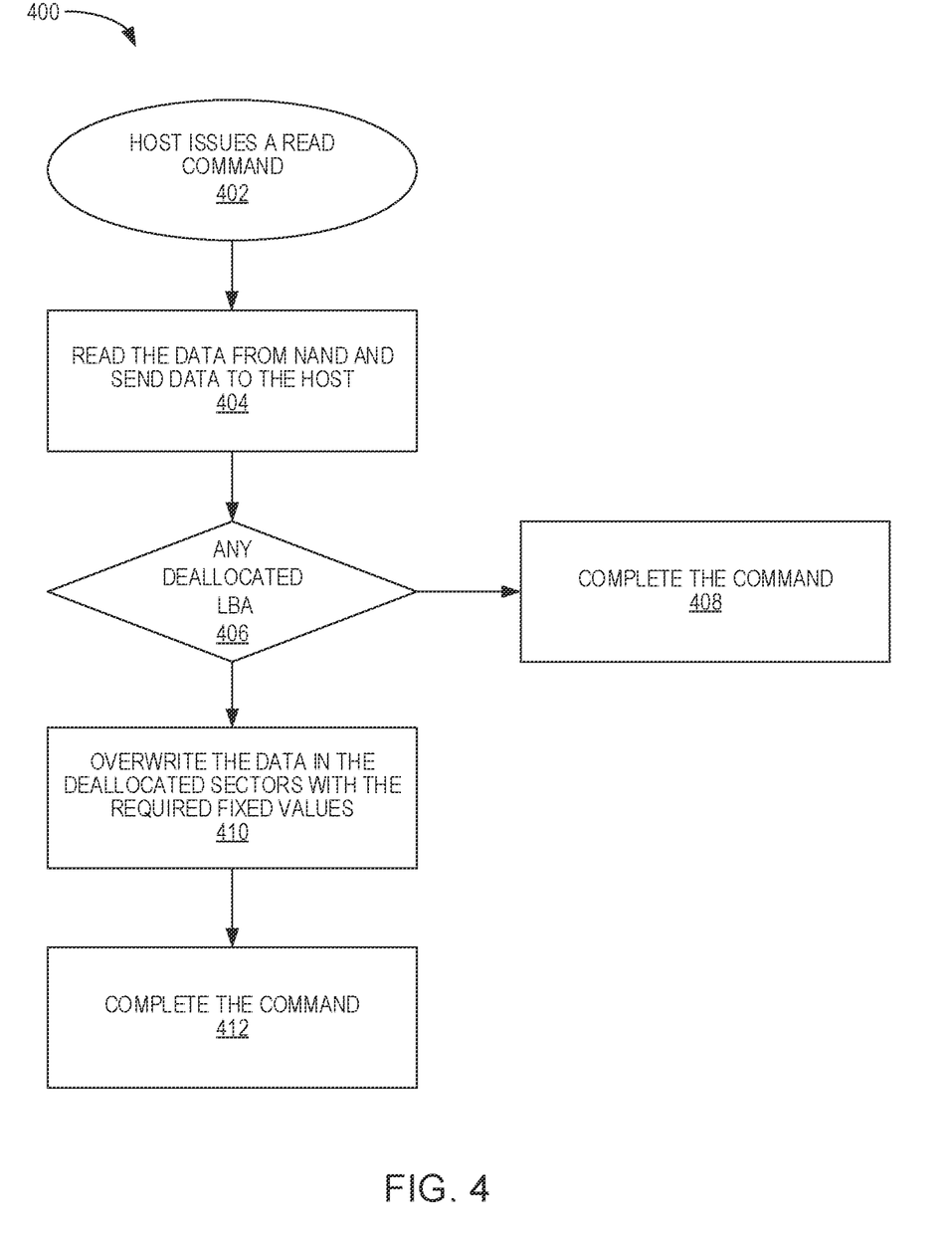
FIG. 4 is a flow chart illustrating a method of unaligned deallocated LBA transfer, according to certain embodiments.

FIG. 4 is a flow chart 400 illustrating a method of unaligned deallocated LBA transfer, according to certain embodiments. The method begins at block 402. At block 402, the host issues a read command. At block 404, the device controller reads the data from the memory device (e.g., NAND) and sends the data to the host (even in unaligned deallocated LBAs scenarios). At block 406, a determination is made regarding whether any of the LBA's are deallocated. If the determination is that there are no LBA's that are deallocated, then the command will be completed at block 408. If the determination is that there are LBA's that are deallocated, then the method continues to block 410. At block 410, the data in the unaligned deallocated sectors are overwritten with the required fixed values. At block 412, once the values are fixed the command is completed. Finally, a completion message is posted to the host device.

Figure 5:
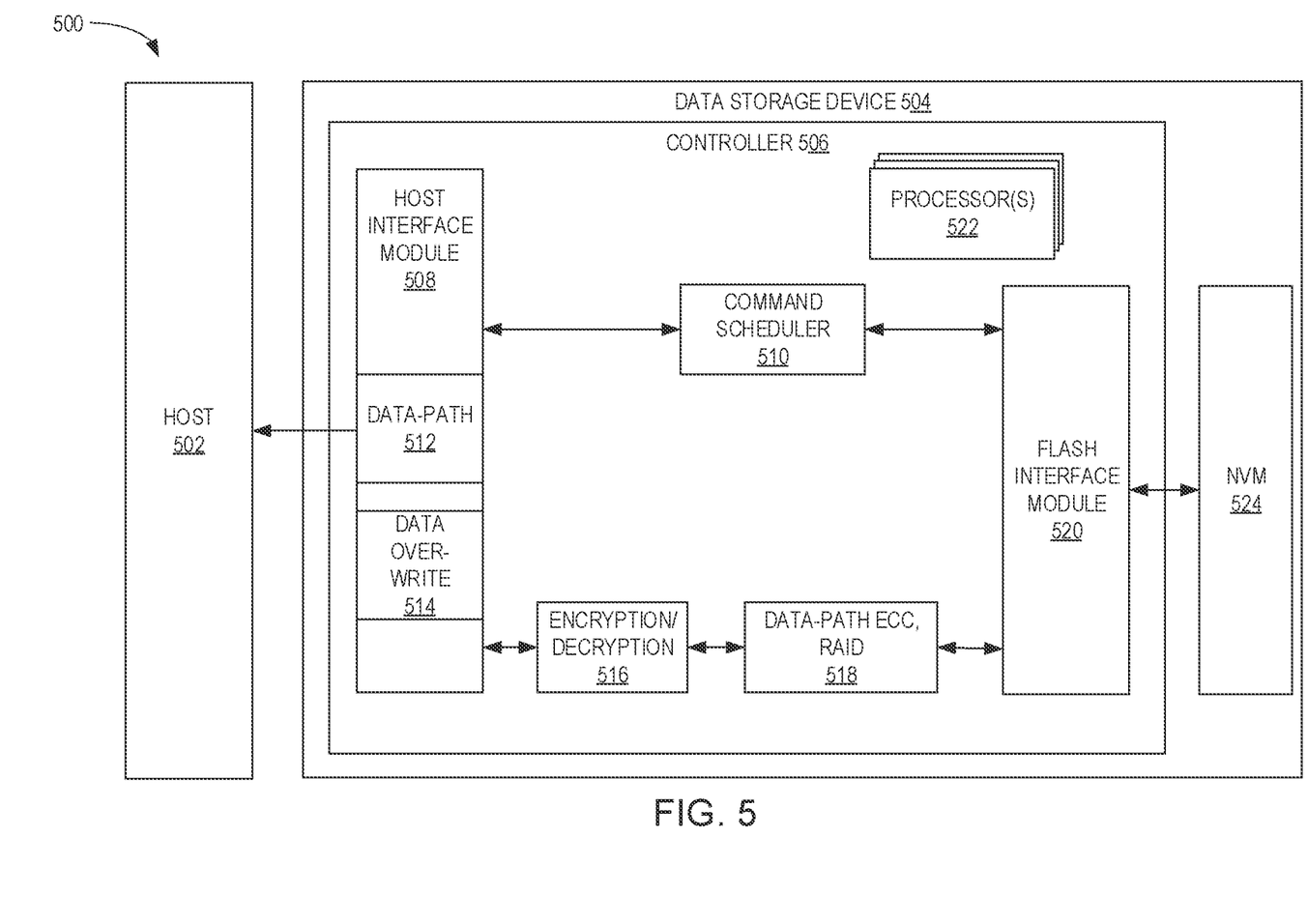
FIG. 5 is a schematic block diagram illustrating a storage system in which a data storage device may function as a data transfer for a host device, according to certain embodiments.

FIG. 5 is a schematic block diagram illustrating a storage system 500 in which a data storage device 504 may function as a data transfer for a host device (i.e., host 502), according to certain embodiments. Aspects of the storage system 500 may be similar to the storage system 100 of FIG. 1. The storage system 500 includes a host device 502 and a data storage device 504. It is to be understood that the storage system 500 may include additional components/elements not shown for simplification purposes.

The data storage device 504 includes a controller 506 and an NVM 524. The host device 502 is coupled to a host interface module (HIM) 508 of the controller 506, where the HIM 508 is configured to receive or fetch commands and data from the host device 502. The HIM 508 also transfers data and messages (e.g., completion messages, interrupt messages, failure messages, etc.) corresponding to executed commands back to the host device 502. The controller 506 further includes a data-path module 512, a data overwrite module 514, an encryption/decryption module 516, a data-path ECC RAID module 518, a flash interface module (FIM) 520, and one or more processors 522.

The data-path module 512 is the component that ignores the marking of the unaligned deallocated LBAs. If a LBA is deemed unaligned and deallocated the data-path module 512 will signal the system to ignore the unaligned deallocated LBAs. When the data-path module 512 ignores the unaligned deallocated LBAs, the data-path module 512 updates the data overwrite module 514. The data overwrite module 514 is configured to later overwrite the values of the sectors that are unaligned and deallocated with the required fixed values.

The one or more processors 522 provide instructions and processing (e.g., computational) power in order to execute commands and logic. When a command is received at the HIM 508, the command is transferred to the command scheduler 510. The one or more processors 522 may process the command to determine what type of command was received.

Figure 6:
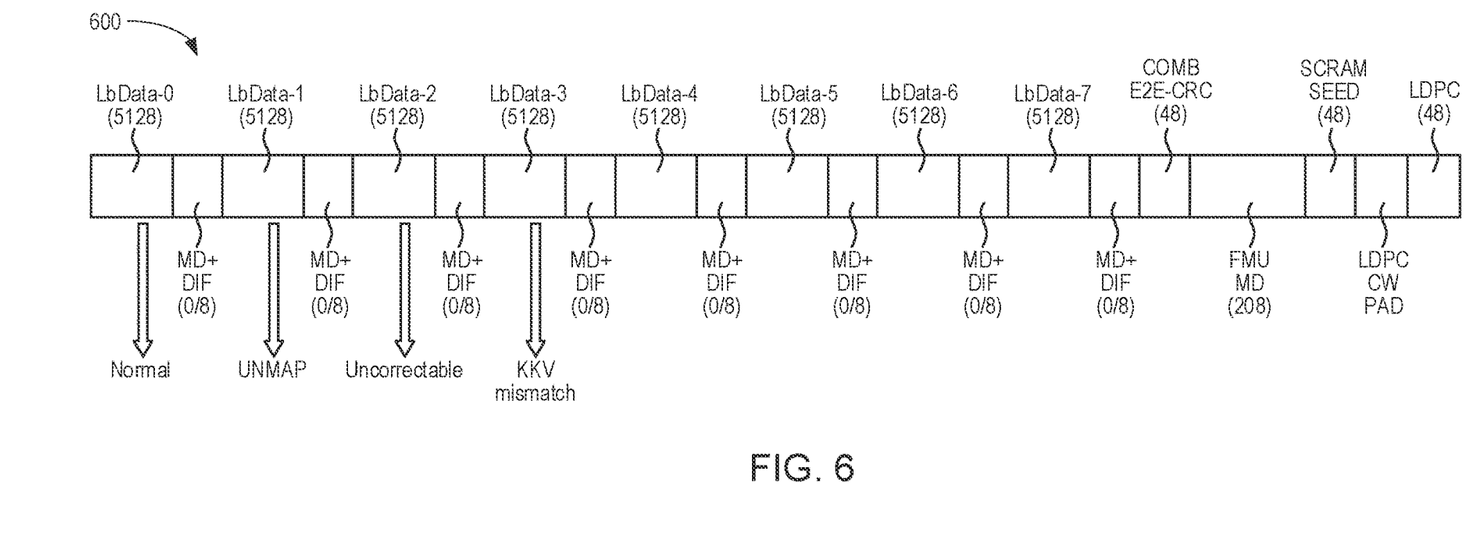
FIG. 6 is an exemplary illustration of an internal packet structure, according to certain embodiments.

FIG. 6 is an exemplary illustration of an internal packet structure 600, according to certain embodiments. It is to be understood while the data packet in FIG. 6 is configured with 512-byte sectors, in another example the byte size may be more or less than the 512-bytes. The granularity is 4 KB and therefore the packet holds eight 512-byte sectors plus the packets metadata, various controls, and status fields. In internal packet structure 600, some of the sectors may be normal while some sectors may be unmapped, uncorrectable, or have key version (KV) mismatch.

The normal, unmapped, uncorrectable, and KV mismatch sectors complicates the data-path since the logic needs to treat each sector separately and fine-tune the data-path. As mentioned in method of FIG. 3, the host deallocates the unmapped, uncorrectable, and KV mismatch sectors. The data storage device does not write 0's or 1's data to the memory device (e.g., NAND) for the unmapped, uncorrectable, and KV mismatch sectors. Instead, the relevant sectors are just marked as deallocated. Later, the host device reads the entire 4 KB including all sectors. The data storage device controller then issues the data transfer in two phases. In the first phase the data that is held in the NAND is transferred. In the second phase, the device controller overwrites the deallocated sectors (unmapped, uncorrectable, and KV mismatch sectors) with fixed values (e.g. 0's or 1's). A completion entry will then be posted to the host.

Figure 7:
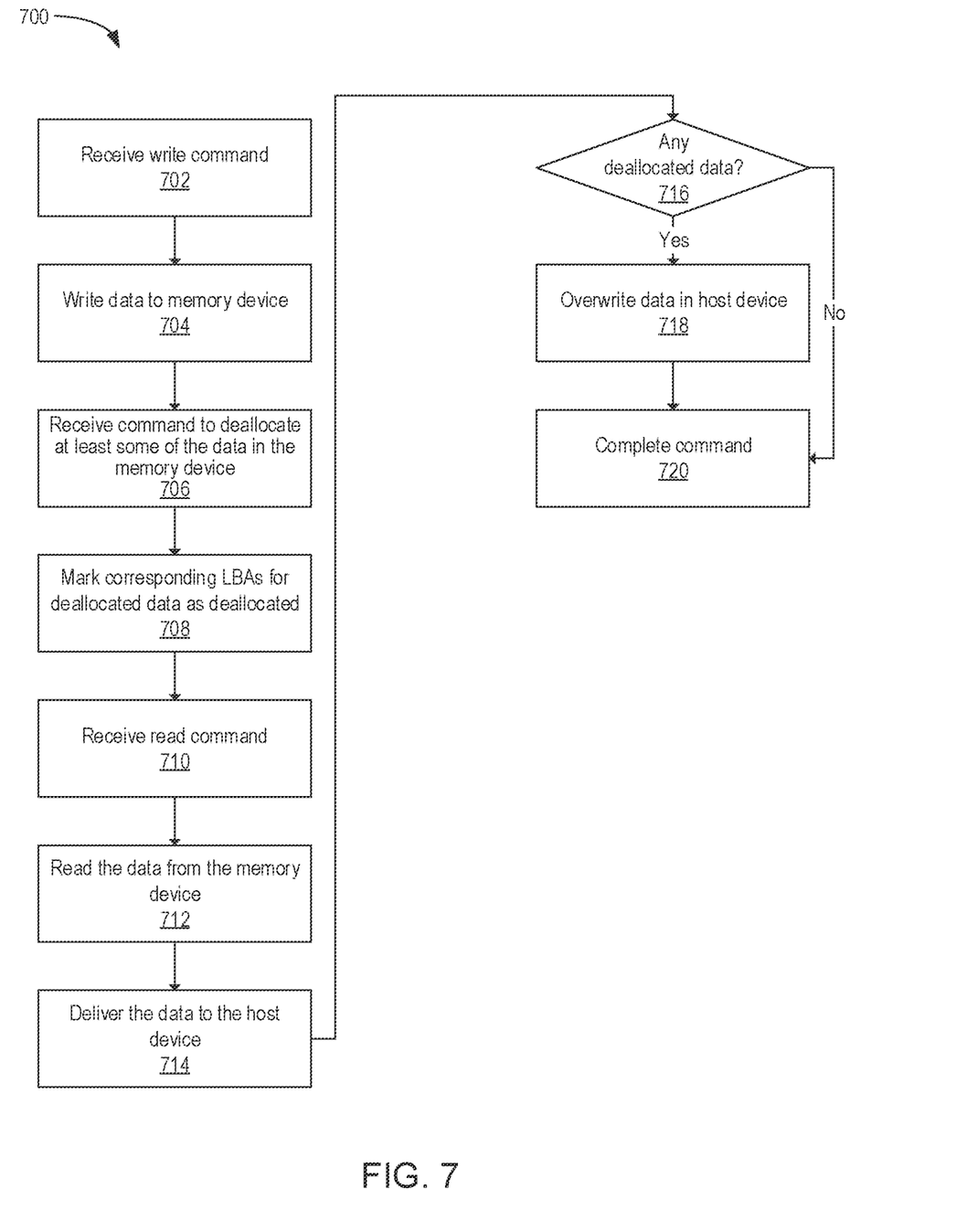
FIG. 7 is a flow chart illustrating a method of LBA transfer, according to certain embodiments.

FIG. 7 is a flow chart 700 illustrating a method of LBA transfer, according to certain embodiments. The method begins at block 702. At block 702, the data storage device receives a write command. At block 704, controller writes the data to the memory device. At block 706, a command is received to deallocate at least some of the data in the memory device. At block 708, the corresponding LBAs are marked for deallocated data as the LBAs are deallocated. At block 710, the data storage device receives a read command.

At block 712, controller reads the data from the memory device. At block 714, the data is delivered to the host device. At block 716, a determination is made regarding whether there is any deallocated data. If the determination is that there is no deallocated data then the data storage device completes the command at block 720. If the determination is that there is deallocated then method proceeds to block 718. At block 718, the data is overwritten in the host device. Once the data is overwritten, then the method proceeds to block 720 to complete the command.

Advantages of the disclosure include simplifying the data path by allowing to write non-valid data to the host DRAM and overwriting it later with the appropriate data while not stalling the data path in any scenario. By not stalling the data path to correct the deallocated data with fixed values the systems performance is increased.

In one embodiment, a data storage device comprises: a memory device; and a controller coupled to the memory device, wherein the controller is configured to: receive a read command; read data associated with the read command from the memory device; send the read data to a host device; determine that at least some data of the read data is deallocated logical block address (LBA) data; overwrite the deallocated LBA data in the host device; and complete the read command. The read data in the memory device has a first granularity and comprises a data packet having a plurality of sectors, wherein the read data sent to the host device has a second granularity that is less than the first granularity, wherein the second granularity is a sector of the plurality of sectors. One or more sectors of the plurality of sectors comprises the deallocated LBA data. The overwriting comprises overwriting one or more sectors. The overwriting comprises writing the deallocated LBA data as all "Is" or all "Us" in the host device. The controller is further configured to receive a command from the host device to deallocate the LBA data. The controller is configured to mark the LBA data as deallocated LBA data and leave the data associated with the read command in the memory device unchanged. Sending the read data to the host device comprises sending the deallocated LBA data to the host device. The deallocated LBA data is actual data, and wherein deallocated data is data the host device previously indicated to the controller to be no longer in use. The controller comprises a host interface module (HIM) and wherein the HIM is configured to perform the overwriting.

In another embodiment, a data storage device comprises: a memory device; and a controller coupled to the memory device, wherein the controller comprises: a host interface module (HIM) configured to be coupled to a host device; and a flash interface module (FIM) coupled to the memory device, wherein the controller is configured to: receive a read command from the host device; read the data from the memory device; send the data to the host device; determine that at least one sector of the data is deallocated, uncorrectable, or has a key version mismatch; and overwrite the at least one sector in the host device. The HIM comprises a data path module and a data overwrite module. The data overwrite module performs the overwrite. The data path module ignores markings of the at least one sector and permits the data to be written to the host device. The overwriting comprises writing data preselected by the host device. The controller is further configured to complete the read command, and wherein completing the command comprises providing an error status to the host device for the at least one sector. The FIM is configured to ignore a deallocation command for the at least one sector.

In another embodiment, a data storage device comprises: memory means; and a controller coupled to the memory means, wherein the controller is configured to: retrieve deallocated data from the memory means; send the deallocated data to a host device; and overwrite the deallocated data in the host device. The overwriting is performed by a data overwrite module disposed in a host interface module (HIM) of the controller. The deallocated data corresponds to data having a size of a granularity of the host device and the granularity of the host device is less than a granularity of the memory means, and wherein the deallocated data in the memory means is actual data the host device previously indicated as data that can be erased.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a read command;
read data associated with the read command from the memory device;
send the read data to a host device;
determine that at least some data of the read data is deallocated logical block address (LBA) data;
overwrite the deallocated LBA data in the host device; and
complete the read command, wherein the read data in the memory device has a first granularity and comprises a data packet having a plurality of sectors, wherein the read data sent to the host device has a second granularity that is less than the first granularity, wherein the second granularity is a sector of the plurality of sectors.

2. The data storage device of claim 1, wherein one or more sectors of the plurality of sectors comprises the deallocated LBA data.

3. The data storage device of claim 2, wherein the overwriting comprises overwriting one or more sectors.

4. The data storage device of claim 1, wherein the overwriting comprises writing the deallocated LBA data as all "1's" or all "0's" in the host device.

5. The data storage device of claim 1, wherein the controller is further configured to receive a command from the host device to deallocate the LBA data.

6. The data storage device of claim 5, wherein the controller is configured to mark the LBA data as deallocated LBA data and leave the data associated with the read command in the memory device unchanged.

7. The data storage device of claim 1, wherein sending the read data to the host device comprises sending the deallocated LBA data to the host device.

8. The data storage device of claim 7, wherein the deallocated LBA data is actual data, and wherein deallocated data is data the host device previously indicated to the controller to be no longer in use.

9. The data storage device of claim 1, wherein the controller comprises a host interface module (HIM) and wherein the HIM is configured to perform the overwriting.

10. A data storage device, comprising:
a memory device; and
a controller coupled to the memory device, wherein the controller comprises:

a host interface module (HIM) configured to be coupled to a host device; and a flash interface module (FIM) coupled to the memory device, wherein the controller is configured to:

receive a read command from the host device;

read the data from the memory device;

send the data to the host device;

determine that at least one sector of the data is deallocated, uncorrectable, or has a key version mismatch; and overwrite the at least one sector in the host device, wherein the read data from the memory device has a first granularity and comprises a data packet having a plurality of sectors, wherein the data sent to the host device has a second granularity that is less than the first granularity, wherein the second granularity is a sector of the plurality of sectors.

11. The data storage device of claim 10, wherein the HIM comprises a data path module and a data overwrite module.

12. The data storage device of claim 11, wherein the data overwrite module performs the overwrite.

13. The data storage device of claim 11, wherein the data path module ignores markings of the at least one sector and permits the data to be written to the host device.

14. The data storage device of claim 10, wherein the overwriting comprises writing data preselected by the host device.

15. The data storage device of claim 10, wherein the controller is further configured to complete the read command, and wherein completing the command comprises providing an error status to the host device for the at least one sector.

16. The data storage device of claim 10, wherein the FIM is configured to ignore a deallocation command for the at least one sector.

17. A data storage device, comprising:

memory means; and a controller coupled to the memory means, wherein the controller is configured to:

retrieve deallocated data from the memory means;

send the deallocated data to a host device; and overwrite the deallocated data in the host device, wherein the deallocated data corresponds to data having a size of a granularity of the host device and the granularity of the host device is less than a granularity of the memory means, and wherein the deallocated data in the memory means is actual data the host device previously indicated as data that can be erased.

18. The data storage device of claim 17, wherein the overwriting is performed by a data overwrite module disposed in a host interface module (HIM) of the controller.

19. The data storage device of claim 17, wherein the deallocated data is unaligned.

20. The data storage device of claim 17, wherein the controller is configured to detect the deallocated data is unaligned.

* * * * *